United States Patent
Block et al.

(10) Patent No.: US 10,407,553 B2
(45) Date of Patent: *Sep. 10, 2019

(54) FIBER-REINFORCED COMPOSITES MADE WITH THERMOPLASTIC RESIN COMPOSITIONS AND REACTIVE COUPLING FIBERS

(71) Applicant: JOHNS MANVILLE, Denver, CO (US)

(72) Inventors: Michael J Block, Centennial, CO (US); Mingfu Zhang, Highlands Ranch, CO (US); Asheber Yohannes, Littleton, CO (US); Klaus Friedrich Gleich, Nuremberg (DE); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,065

(22) Filed: Jun. 30, 2017

(65) Prior Publication Data

US 2017/0298196 A1    Oct. 19, 2017

Related U.S. Application Data

(60) Continuation of application No. 15/285,563, filed on Oct. 5, 2016, now Pat. No. 9,725,564, which is a division of application No. 14/088,096, filed on Nov. 22, 2013, now Pat. No. 9,493,612.

(51) Int. Cl.
| | |
|---|---|
| *C08J 5/08* | (2006.01) |
| *C08J 5/06* | (2006.01) |
| *C08G 69/48* | (2006.01) |
| *C08J 5/04* | (2006.01) |
| *B29C 48/00* | (2019.01) |
| *B29K 105/06* | (2006.01) |

(52) U.S. Cl.
CPC .............. *C08J 5/08* (2013.01); *C08G 69/48* (2013.01); *C08J 5/043* (2013.01); *C08J 5/06* (2013.01); *B29C 48/022* (2019.02); *B29K 2105/06* (2013.01); *C08J 2300/22* (2013.01); *C08J 2377/00* (2013.01); *C08J 2377/02* (2013.01); *C08J 2377/06* (2013.01)

(58) Field of Classification Search
None
See application file for complete search history.

(56) References Cited

U.S. PATENT DOCUMENTS

| 8,017,053 B2 | 9/2011 | DeRijcke et al. |
| 8,293,322 B2 | 10/2012 | Burghardt |
| 9,493,612 B2 * | 11/2016 | Block ............... C08G 69/48 |
| 9,725,564 B2 * | 8/2017 | Block ............... C08G 69/48 |
| 2002/0115748 A1 | 8/2002 | Lee et al. |
| 2005/0136237 A1 | 6/2005 | Beerda et al. |
| 2007/0082199 A1 | 4/2007 | Schweizer et al. |
| 2007/0293607 A1 | 12/2007 | Arakawa et al. |
| 2010/0286343 A1 | 11/2010 | Burghardt et al. |

FOREIGN PATENT DOCUMENTS

| EP | 2 865 705 A1 | 4/2015 |
| FR | 2 979 350 A1 | 3/2013 |
| WO | 02 077077 A2 | 10/2002 |
| WO | 2004 046156 A1 | 6/2004 |

* cited by examiner

*Primary Examiner* — Ana L. Woodward
(74) *Attorney, Agent, or Firm* — Robert D. Touslee

(57) ABSTRACT

Methods of making fiber-resin compositions are described. The methods may include the providing of a thermoplastic resin to an extruder, where the thermoplastic resin may include at least one reactive moiety capable of forming a covalent bond with a coupling agent on a plurality of reactive fibers. The methods may further include combining the thermoplastic resin with the plurality of reactive fibers also supplied to the extruder. The reactive fibers are sized with the coupling agent that reacts with the thermoplastic resin to form the fiber-resin composition, which may be extruded from the extruder. Methods of making fiber-reinforced composite articles from the fiber-resin composition are also described.

23 Claims, 4 Drawing Sheets

FIBER-REINFORCED COMPOSITES MADE WITH THERMOPLASTIC RESIN COMPOSITIONS AND REACTIVE COUPLING FIBERS

CROSS REFERENCE TO RELATED APPLICATION

The present application is a continuation of U.S. application Ser. No. 15/285,563 filed Oct. 5, 2016 which is a division of U.S. application Ser. No. 14/088,096, filed Nov. 22, 2013, now U.S. Pat. No. 9,493,612 issued Nov. 15, 2016.

BACKGROUND OF THE INVENTION

Thermoset plastics are favored for making many kinds of fiber-reinforced articles because of their ease of manufacture. Uncured thermosets are often low viscosity liquids at room temperature and easily wet a fabric of fibers. Once they have migrated through the fabric and surrounded its fibers, a curing stage (sometimes called a hardening stage) commences to polymerize the thermoset into a polymer matrix. Often, this wetting and curing takes place in a mold that defines the shape of the fiber-reinforced article.

The uncured thermoset resins used to make the composite are generally inexpensive, but often off-gas irritating and sometimes dangerous volatile organic compounds (VOCs). The outgassing of VOCs are of particular concern during curing, when the exothermic nature of many thermoset polymerization reactions raise the temperature of the composite and drive more VOCs into the gas phase. In many instances, it is necessary to cure large thermoset articles in facilities equipped with robust ventilation and air scrubbing equipment, increasing the overall production costs.

Thermoset articles are also difficult to repair or recycle. Hardened thermoset resins often have a high degree of crosslinking, making them prone to fractures and breaks. Because thermosets normally will not soften or melt under heat, they have to be replaced instead of repaired by welding. Compounding difficulties, the unrepairable thermoset part normally cannot be recycled into new articles, but must instead be landfilled at significant cost and adverse impact on the environment. The problems are particularly acute when large thermoset parts, such as automotive panels and wind turbine blades, need to be replaced.

Because of these and other difficulties, thermoplastic resin systems are being developed for fiber-reinforced articles that were once exclusively made using thermosets. Thermoplastics typically have higher fracture toughness and chemical resistance than thermosets. They also soften and melt at raised temperatures, allowing operators to heal cracks and weld together pieces instead of having to replace a damaged part. Perhaps most significantly, discarded thermoplastic parts can be broken down and recycled into new articles, reducing landfill costs and stress on the environment.

Unfortunately, thermoplastic composites have their own challenges. The interfacial strength between reinforcing fibers and resin matrix can play a significant role in the performance of composite materials. For thermoplastic resins such as polyamides, the challenge in promoting adhesion through conventional silane coupling agents is greater than that for thermosets, due to the low reactivity of many polymerized thermoplastic resins. Thus, there is a need to develop new ways to improve adhesion between reinforcing fibers and thermoplastic resins for improved mechanical properties of the resulting composite materials. These and other issues are addressed in the present application.

BRIEF SUMMARY OF THE INVENTION

Methods of making and using extruded fiber-resin compositions in the construction of fiber-reinforced composite articles are described. The present compositions include the combination of thermoplastic polymers and reactive fibers. The thermoplastic polymers may be melted and combined with the reactive fibers in an extruder. The reactive fibers have been sized with one or more coupling agents that covalently bond the thermoplastic resin to the fibers. An exemplary coupling reaction between the reactive fibers and the adjacent thermoplastic resin is the reaction between a deblocked isocyanate moiety on the coupling agent and an amide group on a polyamide resin. The covalent coupling between the fibers and thermoplastic resin provided by the coupling agent increases the tensile strength and other mechanical properties of fiber-reinforced composite articles made with the present fiber-resin compositions.

Embodiments may include methods of making fiber-resin compositions. The methods may include the providing of a thermoplastic resin to an extruder, where the thermoplastic resin may include at least one reactive moiety capable of forming a covalent bond with a coupling agent on a plurality of reactive fibers. The methods may further include combining the thermoplastic resin with the plurality of reactive fibers also supplied to the extruder. The reactive fibers are sized with the coupling agent that reacts with the thermoplastic resin to form the fiber-resin composition, which may be extruded from the extruder. Methods of making fiber-reinforced composite articles from the fiber-resin composition are also described.

Embodiments may further include methods of making a fiber-reinforced composite article. The methods may include providing a thermoplastic resin to an extruder, where the thermoplastic resin may include at least one reactive moiety capable of forming a covalent bond with a coupling agent on a plurality of reactive fibers. The methods may further include combining the thermoplastic resin with a plurality of the reactive fibers that are also supplied to the extruder. The plurality of reactive fibers are sized with the coupling agent. The methods may also include extruding the fiber-resin composition from the extruder, where the thermoplastic resin reacts with the coupling agent on the reactive fibers to covalently bond the thermoplastic resin and the fibers in the fiber-resin composition. The fiber-resin composition may be formed into the fiber-reinforced composite article.

Embodiments may yet further include methods of making a glass fiber-reinforced thermoplastic composite article. The methods may include providing a thermoplastic resin to an extruder, where the thermoplastic resin may include at least one polyamide polymer. The thermoplastic resin may be combined with a plurality of the reactive glass fibers that are also supplied to the extruder, where the plurality of reactive glass fibers are sized with a blocked isocyanate-containing coupling agent covalently bonded to the glass fibers. The combination of the thermoplastic resin and the plurality of reactive fibers may be heated to deblock the isocyanate-containing coupling agent, which may then react to form an acyl-urea bond with an amide moiety on the polyamide polymer to form a fiber-resin composition. The fiber-resin composition may be extruded from the extruder, and formed into the glass fiber-reinforced thermoplastic composite article.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

The present application includes methods of making exemplary fiber-resin compositions from thermoplastic resins and reactive fibers that include covalently bonded coupling agents capable of bonding the fibers to the thermoplastic resins. By bonding the thermoplastic resin to the fibers, the strength of the fiber-reinforced article is significantly increased, and other mechanical properties may be improved. The fiber-resin compositions extruded from the extruder may be formed into a fiber-reinforced composite article using a variety of thermoplastic molding techniques. Details about the methods and systems used to make the exemplary fiber-reinforced compositions and fiber-reinforced composite articles are described below.

Exemplary Methods of Making Fiber-Resin Compositions

Figure 1:
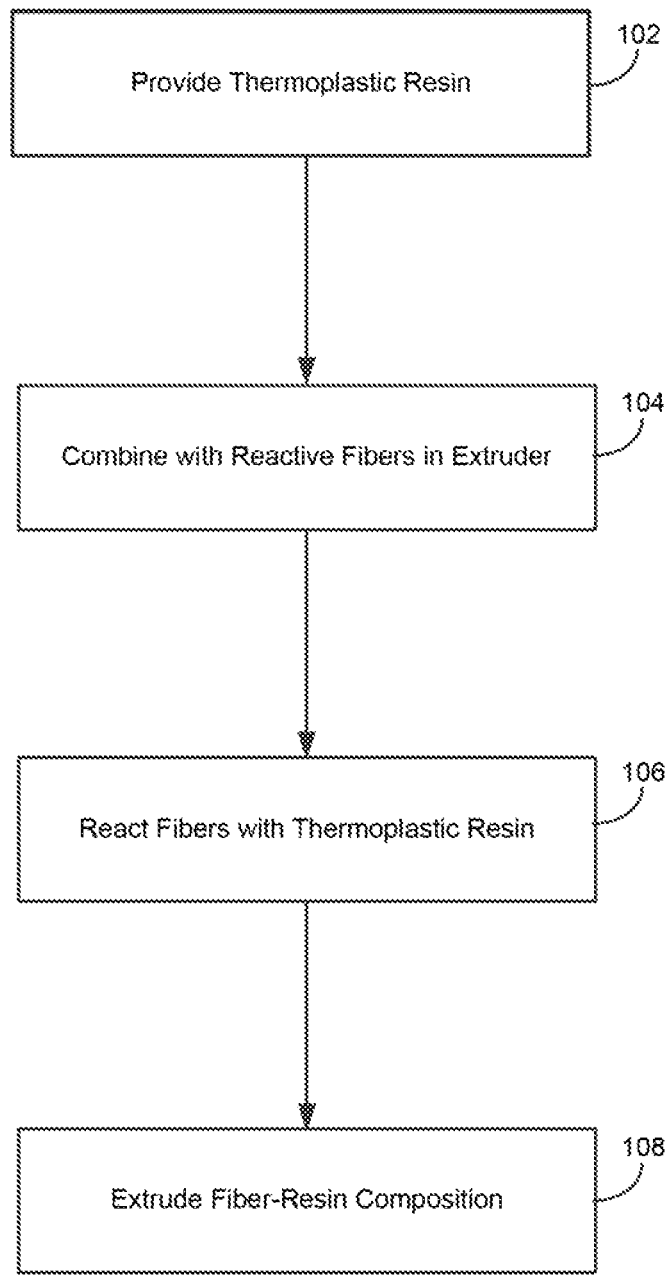
FIG. 1 is a flowchart showing selected steps in a method of making fiber-resin compositions according to embodiments of the invention.

FIG. 1 is a flowchart showing an exemplary method 100 of making the fiber-resin compositions. The method 100 may include providing thermoplastic resin to an extruder 102. The thermplastic resin may include at least one reactive moiety capable of forming a covalent bond with a coupling agent on a plurality of reactive fibers. The method 100 may also include combining the thermoplastic resin with the plurality of fibers that are also supplied to the extruder 104. Inside the extruder, the coupling agent on the plurality of fibers may be activated (e.g., deblocked) to react with the reactive moiety on the thermoplastic resin 106. A fiber-resin composition that includes the fibers bonded through the coupling agent to the thermoplastic resin may be extruded from the extruder 108.

The extruder configuration and extrusion technique may be selected based on the size and type of fibers combined with the reactive resin composition in the extruder. For example, when the plurality of fibers are chopped, short glass fibers (e.g., less than 0.5 inches in length) a reactive extrusion technique may be used to produce the fiber-resin composition. When the plurality of fibers are glass rovings, and/or continuous glass fibers, a direct-long fiber thermoplastic (D-LFT) extrusion technique may be used to produce the fiber-resin composition. Additional details about each of these extrusion techniques are provided as follows:

Exemplary Reactive Extrusion Techniques

Reactive extrusion is a low-cost, versatile extrusion technique that involves the use of an extruder as a chemical reactor. Chemical reactions associated with resins are carried out in situ while the extrusion process, including mixing of the resin composition with fibers and other reinforcement material, is in progress. Therefore, reactive extrusion differs from conventional extrusion methods in which typically no chemical reactions occur during extrusion.

A reactive extrusion process may start by supplying short glass fibers and the reactive composition to the extruder. Once inside the extruder, the fibers and resin composition mix under conditions that promote the chemical reaction, such as formation of covalent bonding between the fibers and the resin.

When the short glass fibers have been sized with reactive compounds such as coupling agents, the conditions in the extruder promote the reaction of the fibers with the thermoplastic resin. A coupling agent may form highly reactive moieties in situ and covalently bond the thermoplastic resin to the fibers, improving the mechanical properties of the fiber-reinforced article made with the reactively extruded fiber-resin composition.

Exemplary Long Fiber Thermoplastic Extrusion Techniques

Direct long fiber thermoplastic (D-LFT) molding is a technology where thermoplastic resin is directly compounded with long glass fibers and then molded in one operation. Different from a conventional extrusion process in which chopped fibers are used, in a D-LFT process continuous roving strands are fed into extruder. The advantage of D-LFT is the ability to produce significantly longer glass fibers in the final composite materials. In comparison to a standard LFT process based on long fiber pellets, the D-LFT process doesn't produce semi-finished material. When D-LFT is used in compression or injection molding, a melted resin-fiber composition may transfer into a molding tool located in a compression press or directly injected into the molding.

Additional LFT processes may form pellets as a fiber-resin composition. The pellets have a typical length of ½ inch to up to 2 inches and are produced by impregnating in a cross head tie. The reactive resin composition may be combined with fibers typically at the end of an extruder and then further polymerized by applying heat prior to the chopping step. The pellets are semi-finished materials that can be molded in a separate step, such as a compression step using a plasticator or in injection molding.

In both LFT and D-LFT processes the resulting composites contain longer glass fibers of ½" (12 mm) up to 2" (50 mm) in length. Longer fiber length combined with excellent wet-out can provide improved mechanical properties such as higher stiffness and strength compared to short fiber-reinforced composites made in a conventional extrusion process using chopped fibers. Long-fiber reinforced thermoplastic composites produced in LFT and D-LFT processes are of great interest to many industries including automotive, due to their excellent mechanical properties and high stiffness-to-weight ratio.

Exemplary Fibers

The fibers may be one or more types of fibers chosen from glass fibers, ceramic fibers, carbon fibers, metal fibers, and organic polymer fibers, among other kinds of fibers. Exemplary glass fibers may include "E-glass", "A-glass", "C-glass", "S-glass", "ECR-glass" (corrosion resistant glass), "T-glass", and fluorine and/or boron-free derivatives thereof. Exemplary ceramic fibers may include aluminum oxide, silicon carbide, silicon nitride, silicon carbide, and basalt fibers, among others. Exemplary carbon fibers may include graphite, semi-crystalline carbon, and carbon nano tubes, among other types of carbon fibers. Exemplary metal fibers may include aluminum, steel, and tungsten, among other types of metal fibers. Exemplary organic polymer fibers may include poly aramid fibers, polyester fibers, and polyamide fibers, among other types of organic polymer fibers.

The fiber length may range from short-to-intermediate chopped fibers (e.g., about 0.5 inches or less in length) to long fibers (e.g., more than about 0.5 inches in length), including unchopped fibers, continuous fibers, rovings, and wound fibers, among others.

Reactive glass fibers may be formed by contacting glass fibers with a sizing composition that includes a blocked isocyanate coupling compound. These coupling compounds include a moiety that covalently bonds the compound to a surface on the glass fiber (e.g., a silicon-containing moiety), and also include a blocked isocyanate group. The blocked isocyanate group may be represented by the formula:

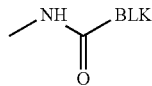

where the "BLK" moiety represents a blocking group that can be reversibly bonded to the carbon atom of the isocyanate group.

Exemplary silicon-containing coupling moieties may be represented by:

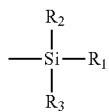

Where $R_1$, $R_2$, and $R_3$ may be the same or different, and each may represent an alkyl, aryl, alkoxy, halogen, hydroxyl, or cyclic structure. Exemplary silicon-containing coupling moieties may include trialkoxysilane groups such as —Si(OMe)$_3$, —Si(OEt)$_3$, etc.

Exemplary blocked isocyanate moieties may include an isocyanate group (—N=C=O) where the carbon is reversibly bonded to a blocking group. The blocked isocyanate group may be obtained by reacting the free isocyanate group with a compound that renders it unreactive. A suitable blocking agent for the isocyanate group may be determined by its ability to prevent the blocked isocyanate from reacting until a desired temperature is achieved. Examples of compounds that may be suitable blocking agents include, but are not limited to, oximes such as methyl ethyl ketoxime, acetone oxime, and cyclohexanone oxime, lactams such as ε-caprolactam, and pyrazoles. Organosilicon compounds with a blocked isocyanate group are known in the art, e.g. see U.S. Patent Publication 2007/0123644, incorporated herein by reference. Upon heating or other deblocking conditions, these blocked isocyanates decompose to free isocyanate and the blocking species. Deblocking temperatures depend on the blocking groups and typically are in the range 70° C. to 200° C. When the sized glass fibers with are exposed to unblocking conditions (e.g., elevated temperatures) the isocyanate group may become deblocked to form the active isocyanate compound chemically bonded to the glass surface. Now deblocked, the isocyanate group is available to react with the adjacent thermoplastic polymer, coupling the polymer and glass fiber through the coupling compound.

An alternative description of the blocked isocyanate coupling compound may be represented by formula I:

wherein S represents the silicon containing coupling moiety capable of bonding to the surface of the glass fiber, A represents the blocked isocyanate moiety, and X represents a linking moiety capable of linking the S moiety and the A moiety. As examples of suitable X moieties, mention may be made of alkyl, aryl, and alkyl-aryl groups.

Exemplary coupling compounds may include blocked isocyanate coupling compounds having a silicon-containing moiety and a blocked isocyanate moiety. These blocked isocyanate coupling compounds may include carboxamide compounds, carbamate compounds, and isocyanurate compounds, among others. Specific examples of carboxamide compounds include 2-oxo-N-(3-(triethoxysilyl)propyl) azepane-1-carboxamide. Specific examples of carbamate compounds include triethoxysilylpropylethyl carbamate and (3-triethoxysilylpropyl)-t-butyl carbamate. Specific examples of isocyanurate compounds include tris(3-trimethoxysilylpropyl) isocyanurate. Additional details about these and other exemplary compounds, as well as methods of making them, can be found in co-assigned U.S. Pat. No. 8,293,322, entitled "SURFACES CONTAINING COUPLING ACTIVATOR COMPOUNDS AND REINFORCED RESINS PRODUCED THEREFROM", the entire contents of which are herein incorporated by reference for all purposes.

Exemplary sizing compositions may also include compounds that can enhance the fibers' physical characteristics in a number of ways including increased hardness, increased mechanical strength, greater wettability, and increased adhesion between the fibers and resin. For example, the sizing compositions may include one or more of wetting agents, film-forming polymers, lubricants, defoamers, and biocides, among other compounds.

The reactive fibers may be formed by applying an exemplary sizing composition to the fibers by suitable methods known to one of skill in the art. For example, the sizing composition may be applied to glass fibers pulled from a bushing using a kiss-roll applicator. Other ways of applying the sizing composition may include contacting glass fibers with other static or dynamic applicators, such as a belt applicator, spraying, dipping, or any other means.

Exemplary Thermoplastic Resins

The thermoplastic resin may include one or more polymers that can form covalent bonds with the deblocked isocyanate moiety on the sized glass fibers of the substrate. For example, polyamide polymers (i.e., nylon polymers) have an amide moiety capable of forming a covalent bond with the deblocked isocyanate moiety. Specific examples of these polyamide polymers may include polyamide-6; polyamide-6,6; polyamide-6,12; polyamide-4,6; polyamide-6, 10; polyamide 12, polyamide 6T (polyhexamethylene terephthalamide); and polyamide 6I (polyhexamethylene isophthalamide), among other polyamide polymers. The thermoplastic polymer may also include combinations of two or more different polymers, such as two or more different polyamide polymers. In addition to the polyamide polymers, exemplary thermoplastic polymers may include polybutylene terephthalate (PBT) polymers, thermoplastic polyurethanes (TPUs), poly(styrene-co-maleic anhydride), maleated polypropylene, poly(hydroxyl-ethyl methacrylate), among other kinds of thermoplastic polymers.

Exemplary Methods of Making Fiber-Reinforced Composite Articles

Figure 2:
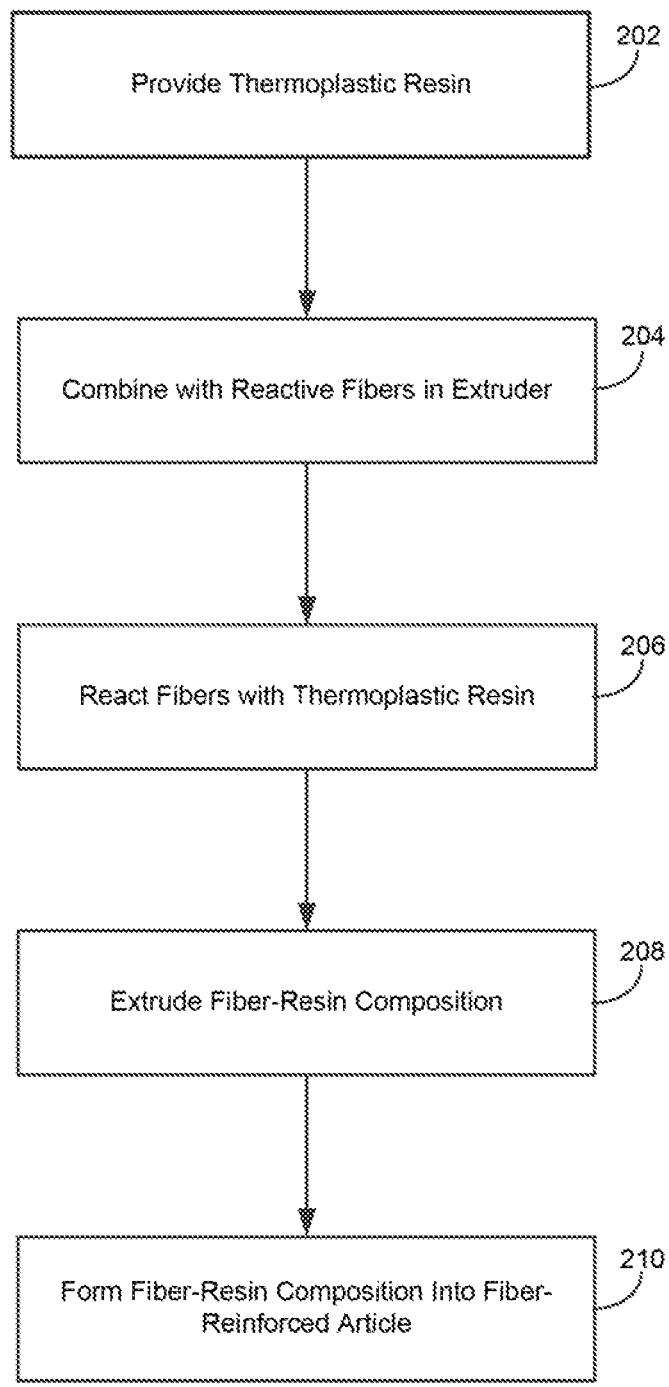
FIG. 2 is a flowchart showing selected steps in a method of making a fiber-reinforced article according to embodiments of the invention.

FIG. 2 is a flowchart showing an exemplary method 200 of making the fiber-reinforced composite articles. The method 200 may include providing a thermoplastic resin to an extruder 202. The thermplastic resin may include at least one reactive moiety capable of forming a covalent bond with a coupling agent on a plurality of reactive fibers. The method 200 may also include combining the thermoplastic resin with the plurality of fibers that are also supplied to the extruder 204. Inside the extruder, the coupling agent on the plurality of fibers may be activated (e.g., deblocked) to react with the reactive moiety on the thermoplastic resin 206. A fiber-resin composition that includes the fibers bonded through the coupling agent to the thermoplastic resin may be extruded from the extruder 208. The fiber-resin composition may then be formed into the fiber-reinforced composite article 210 by incorporating them into the article.

Exemplary techniques for forming the fiber-resin composition into the fiber-reinforced composite articles may include injection molding and/or compression molding of the composition into the fiber-reinforced article. Heat may be used in the compression molding of a fully-polymerized fiber-resin composition to maintain the flowability of the composition as it is filling a mold or otherwise forming a shape of the final article.

Exemplary Composition and Article Fabrication Systems

Figure 3:
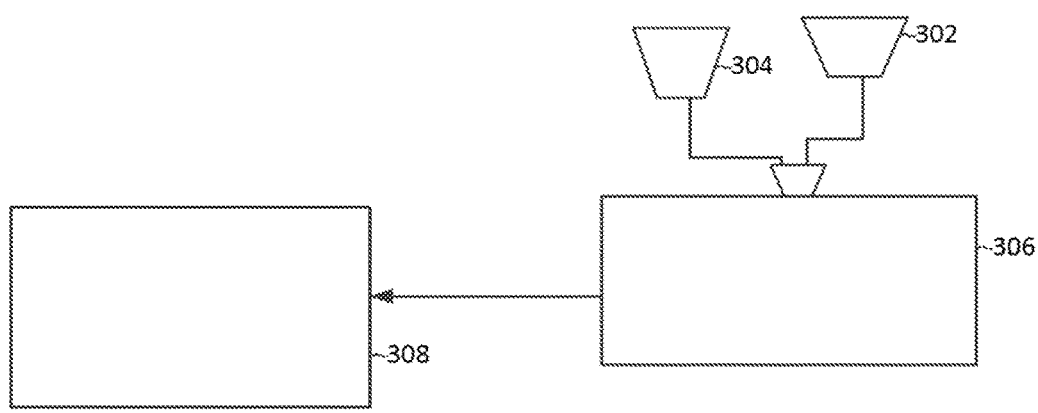
FIG. 3 shows an exemplary system for making fiber-resin compounds and fiber-reinforced articles according to embodiments of the invention.

FIG. 3 shows an exemplary system 300 for making the present fiber-resin compounds and fiber-reinforced articles. The system 300 includes a supply of a thermoplastic resin composition 302, and a supply of fibers 304 that can be fed to an extruder 306. As noted above, systems 300 may be configured to accept short fibers (e.g., short-chopped glass fibers), or long fibers. When the system 300 is configured to accept short fibers, the extruder 306 is configured to conduct a reactive extrusion process to form the fiber-resin composition. Alternatively when the system 300 is configured to accept long fibers, extruder three or six configured to conduct a D-LFT process to form the fiber-resin composition.

The fiber-resin composition extruded by the extruder 306 may be directly supplied to a molding machine 308 that forms the composition into the fiber-reinforced composite article. Exemplary molding machines 308 may include injection molding machines, and compression molding machines, among other types of molding machines. A heated conduit (not shown) may be used to maintain the fiber-resin composition in a molten/liquid state as it is transported from the extruder 306 to the molding machine 308. Alternatively, the fiber-resin composition may be cooling or cooled as it moves from the extruder 306 to the molding machine 308.

Exemplary Fiber-Reinforced Composite Articles

Figure 4:
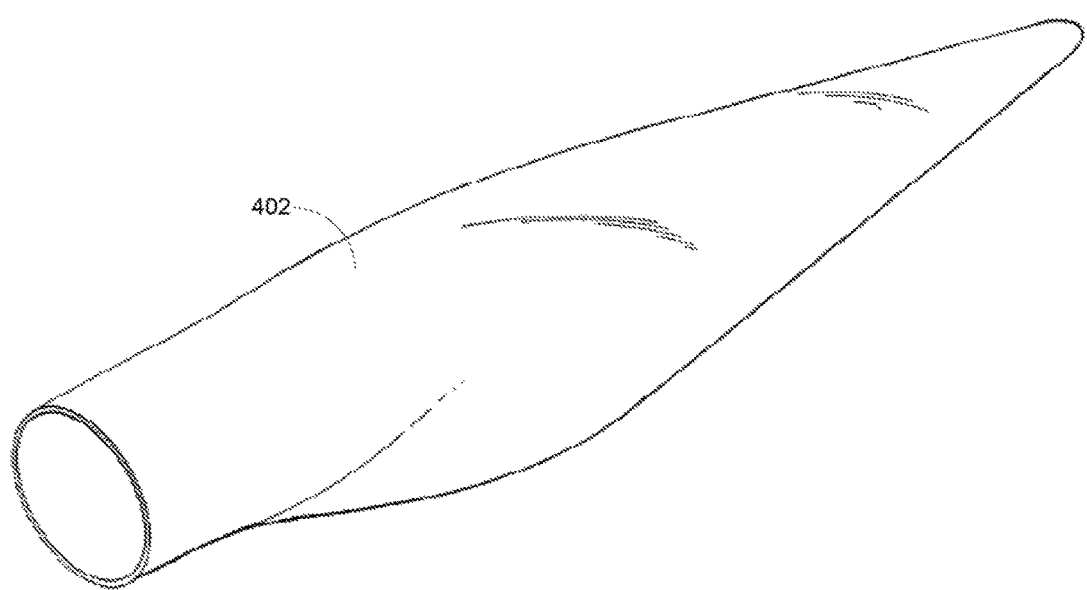
FIG. 4 shows a exemplary fiber-reinforced article made according to the present methods.

FIG. 4 shows an exemplary fiber-reinforced composite wind turbine blade 402 formed by the fiber-resin compositions. The blade 402 is one of many types of articles that can be formed by the present compositions. Other articles may include vehicle parts (e.g., aircraft parts, automotive parts, etc.), appliance parts, containers, etc.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the fiber" includes reference to one or more fibers and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A fiber-resin composition for making a fiber-reinforced article, the fiber-resin composition comprising:
    fibers, wherein at least some of the fibers are glass fibers that include a coupling agent bonded to the glass fibers; and
    a thermoplastic resin comprising a polyamide polymer, wherein the polyamide polymer includes a plurality of amide moieties that form covalent bonds with the coupling agent bonded to the glass fibers,
    wherein the thermoplastic resin is in a molten state in the fiber-resin composition, and
    wherein the coupling agent comprises:
    (i) a silicon-containing moiety covalently bonded to the glass fibers,
    (ii) a reactive isocyanate moiety capable of forming the covalent bond with the at least one reactive moiety of the thermoplastic resin when a blocking group is released from the reactive isocyanate moiety, and
    (iii) a linking moiety selected from the group consisting of an unsubstituted alkyl group, an unsubstituted aryl group, and an unsubstituted alkyl-aryl group, wherein the linking moiety covalently bonds the silicon-containing moiety and the reactive isocyanate moiety together in the coupling agent.

2. The fiber-resin composition of claim 1, wherein the glass fibers have a length of less than 0.5 inches in the fiber-resin composition.

3. The fiber-resin composition of claim 1, wherein the glass fibers have a length ranging from 0.5 inches to 2 inches in the fiber-resin composition.

4. The fiber-resin composition of claim 1, wherein the glass fibers comprise at least one type of glass selected from the group consisting of E-glass, A-glass, C-glass, S-glass, ECR-glass, and T-glass.

5. The fiber-resin composition of claim 1, wherein the silicon-containing moiety has a formula of:

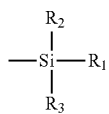

wherein $R_1$, $R_2$, and $R_3$ may be the same or different, and each may represent an alkyl group, an aryl group, an alkoxy group, a halogen, a hydroxyl group, or a cyclic structure.

6. The fiber-resin composition of claim 1, wherein the reactive isocyanate moiety has a formula of:

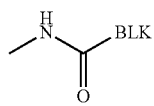

wherein BLK represents the blocking group that is reversibly bonded to a carbon atom on the reactive isocyanate moiety.

7. The fiber-resin composition of claim 1, wherein the blocking group is selected from the group consisting of oximes, lactams, and organosilicon compounds.

8. The fiber-resin composition of claim 7, wherein the oximes are selected from the group consisting of methyl ethyl ketoxime, acetone oxime, and cyclohexanone oxime.

9. The fiber-resin composition of claim 7, wherein the lactams comprise ε-caprolactam.

10. The fiber-resin composition of claim 1, wherein the polyamide polymer is selected from the group consisting of polyamide-6; polyamide-6,6; polyamide-6,12; polyamide-4,6; polyamide-6,10; polyamide-12; polyamide 6T; and polyamide 6I.

11. A fiber-reinforced article comprising:
fibers; and
a thermoplastic polyamide polymer, wherein the thermoplastic polyamide polymer includes a plurality of amide moieties that are covalently bonded to the fibers by a coupling agent that is covalently bonded to both the fibers and the thermoplastic polymer,
wherein the fiber-reinforced article is formed from a fiber-resin composition that includes a molten amalgam of the fibers and the thermoplastic polymer,
wherein at least a portion of the fibers in the fiber-resin composition are reactive glass fibers bonded to the coupling agent, and
wherein the coupling agent comprises:
(i) a silicon-containing moiety covalently bonded to the glass fibers,
(ii) an unblocked isocyanate moiety that has decoupled from a blocking group at the melting temperature of the thermoplastic polymer, wherein the unblocked isocyanate moiety forms the covalent bond with the thermoplastic polymer, and
(iii) a linking moiety selected from the group consisting of an unsubstituted alkyl group, an unsubstituted aryl group, and an unsubstituted alkyl-aryl group, wherein the linking moiety covalently bonds the silicon-containing moiety and the isocyanate moiety together in the coupling agent.

12. The fiber-reinforced article of claim 11, wherein the fibers have a length of less than 0.5 inches in the fiber-reinforced article.

13. The fiber-reinforced article of claim 11, wherein the fibers have a length ranging from 0.5 inches to 2 inches in the fiber-reinforced article.

14. The fiber-reinforced article of claim 11, wherein the polyamide polymer is selected from the group consisting of polyamide-6; polyamide-6,6; polyamide-6,12; polyamide-4,6; polyamide-6,10; polyamide-12; polyamide 6T; and polyamide 6I.

15. The fiber-reinforced article of claim 11, wherein the article is selected from the group consisting of a turbine blade, a vehicle part, an appliance part, and a container.

16. A system for making a fiber-reinforced article, the system comprising:
a supply of fibers, wherein the fibers comprise glass reactive fibers that are covalently bonded to a coupling agent;
a supply of thermoplastic resin, wherein the thermoplastic resin comprises a polyamide polymer, and wherein the polyamide polymer includes a plurality of amide moieties capable of covalently bonding to isocyanate moieties on the coupling agents, wherein the coupling agent further comprises:
a silicon-containing moiety covalently bonded to the glass fibers, and
a linking moiety selected from the group consisting of an unsubstituted alkyl group, an unsubstituted aryl group, and an unsubstituted alkyl-aryl group, wherein the linking moiety covalently bonds the silicon-containing moiety and the isocyanate moiety together in the coupling agent;
an extruder that combines the fibers and the thermoplastic resin into a molten amalgam; and
a molding machine that accepts the molten amalgam from the extruder and molds into the fiber-reinforced article.

17. The system of claim 16, wherein the supply of fibers are short glass fibers having a length of less than 0.5 inches in the fiber-reinforced article.

18. The system of claim 16, wherein the supply of fibers are long glass fibers having a length ranging from 0.5 inches to 2 inches in the fiber-reinforced article.

19. The system of claim 16, wherein the coupling agent comprises a blocking group coupled to the isocyanate moiety in the supply of sized fibers, wherein the blocking group is decoupled from the isocyanate moiety in the molten amalgam of the fiber and the thermoplastic resin.

20. The system of claim 19, wherein the blocking group is selected from the group consisting of oximes, lactams, and organosilicon compounds.

21. The system of claim 19, wherein the blocking group comprises ε-caprolactam.

22. The system of claim 16, wherein the polyamide polymer is selected from the group consisting of polyamide-6; polyamide-6,6; polyamide-6,12; polyamide-4,6; polyamide-6,10; polyamide-12; polyamide 6T; and polyamide 6I.

23. The system of claim 16, wherein the molding machine is selected from the group consisting of an injection molding machine and a compression molding machine.

\* \* \* \* \*